UNITED STATES PATENT OFFICE.

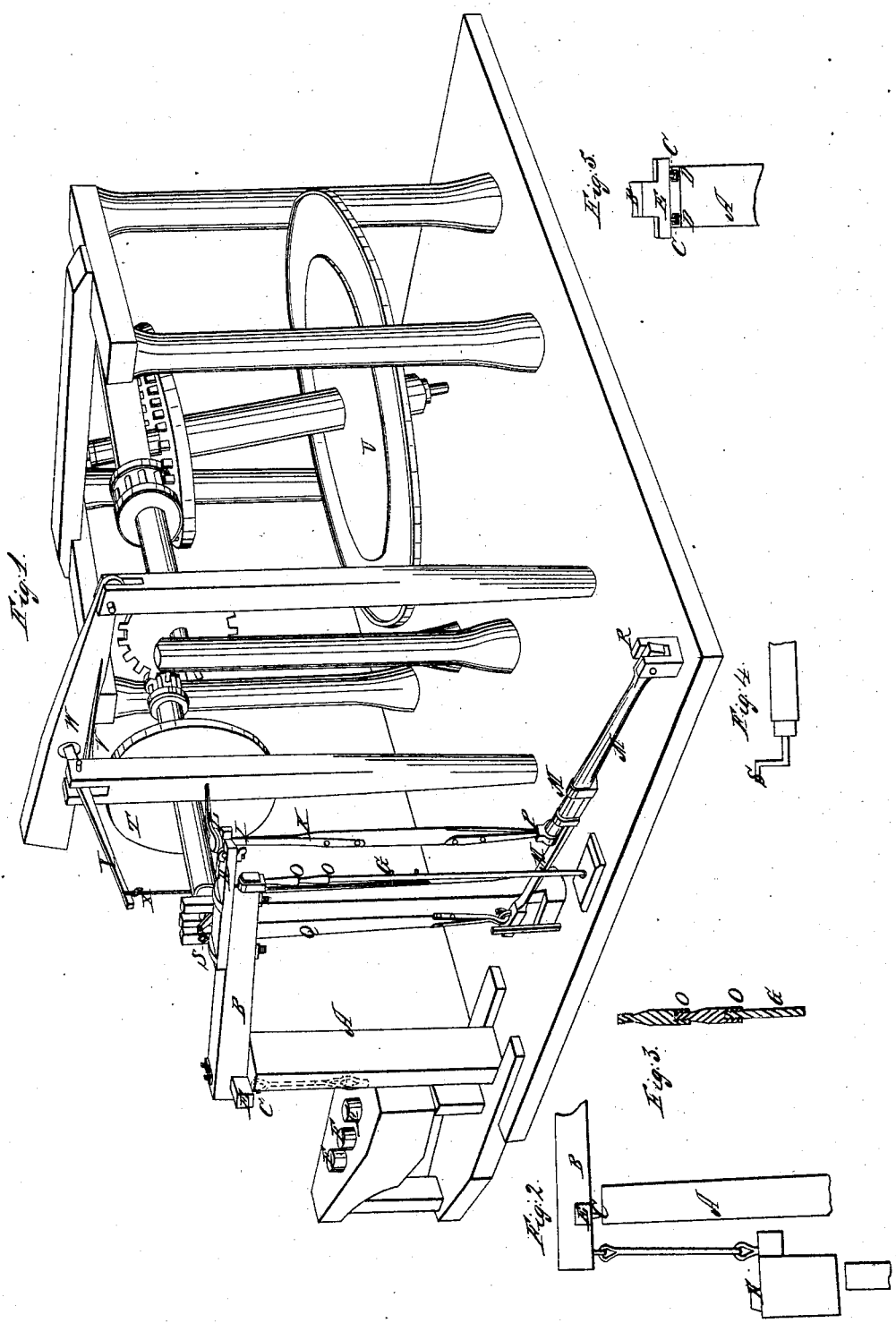
G. C. Doherty,
Boring Artesian Wells.
Nº 897.
Patented Aug. 29, 1838.

GEORGE C. DOHERTY, OF CUMBERLAND COUNTY, KENTUCKY.

MACHINE FOR BORING ROCK.

Specification of Letters Patent No. 897, dated August 29, 1838.

*To all whom it may concern:*

Be it known that I, GEORGE C. DOHERTY, of Cumberland county, Kentucky, have invented, constructed, made, and applied to use a new and useful improvement in the mode of boring rock for water by machinery, called "A machine for boring rock for water," specified in the words following, to wit, reference being had to the annexed drawings of the same, making part of this specification.

This improvement in boring rock for water consists in a post A, Figures 1, 2 and 5, placed firmly in the ground, about 6 feet high, on which a lever B is placed, say 14 feet long, about 10 inches square at one end and 4 at the other, the lever to be placed on two pivots C C of metal resting in links D D of the same let in the posts, the pivots to be placed in a cross piece of timber E, 3 feet long, let in crosswise the lever, the pivots to be 2 feet apart, the pivots to be placed say nine inches from where weights F are to be fixed to the butt end to balance the lever and auger, the auger G, Figs. 1 and 3, to be hung 12 feet from the pivots on the other end. On the lever is to be placed and secured with screws a piece of timber H, Fig. 1, 6 feet long, 6 inches wide and about 2½ inches thick and extending about one foot longer than the lever and bearing over to the side next to the crank (which will hereinafter be described) at the end about 4 inches to have an open mortise I to receive a rod or staff K with a screw L about 14 inches long on the top end, the use of which is to apply or raise the augers from or to the rock and to connect it with a spring treadle M, the poles or boring auger G to be connected with screws O as needed. The pole or auger should be 26 feet long to have a set reduced down by halves to 9¾ inches for the purpose of inserting in to lengthen the pole as proceeded downward in the rock. The spring treadle M, should be about 13 feet long to be made of two pieces of timber, the one to be about three and a half inches square, nine feet long, the other piece to be of the same size at the end that is lapped on to be flattened to 1½ inches at the other end. This piece is to be placed under the other and to lap about 3 feet to be banded secure with two iron bands, the before mentioned rod or shaft to be long enough to connect the lever with the end of the first piece of the treadle to be fixed with a swivel P on the end above the second piece. A pitman Q is to be fixed on the spring end of the treadle about 3½ feet from where the rod is placed, the treadle to be placed nearly parallel with the lever, the butt end to be secured in a post R in the manner of a hinge about one foot high, nearly in front of the lever, the power to be applied by a crank S to the pitman Q, with a fly wheel T of about six feet diameter to be placed on the shaft of the crank. The best power is to be had by the inclined wheel U, it requires regularity, and the gearing should be such as to give about fifty motions to the revolution of the wheel. The suspension of the motion or operation of the machinery is performed by means of a spring V applied on the top of the fly-wheel by means of weight W attached to the spring and let on the wheel at pleasure by use of a rope X to the end of a small lever Y to raise or lower for the purpose mentioned.

What I claim as my invention and desire to secure by Letters Patent is—

The manner in which I have combined and connected the shaft K of the auger, with the lever B, the treadle M, and the pitman Q, so as to be operated upon by animal or other power, as set forth.

GEORGE C. DOHERTY.

Witnesses:
WM. P. ELLIOT,
JOS. B. WOOD.